(12) United States Patent
Yang (10) Patent No.: US 12,272,781 B2
(45) Date of Patent: Apr. 8, 2025

(54) ADHESIVE APPLICATION APPARATUS AND BATTERY PRODUCTION LINE HAVING SUCH ADHESIVE APPLICATION APPARATUS

(71) Applicant: CONTEMPORARY AMPEREX TECHNOLOGY (HONG KONG) LIMITED, Hong Kong (CN)

(72) Inventor: Qiancheng Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 126 days.

(21) Appl. No.: 18/298,381

(22) Filed: Apr. 11, 2023

(65) Prior Publication Data

US 2023/0335775 A1  Oct. 19, 2023

(30) Foreign Application Priority Data

Apr. 14, 2022  (CN) .......................... 202220855179.9

(51) Int. Cl.
*H01M 10/04* (2006.01)
(52) U.S. Cl.
CPC .............................. *H01M 10/0404* (2013.01)
(58) Field of Classification Search
CPC ................. C09J 7/38; B65H 2701/377; B65H 2301/46312; B65H 2301/41486;
(Continued)

(56) References Cited

U.S. PATENT DOCUMENTS

2005/0061426 A1  3/2005  Parker et al.
2006/0081328 A1  4/2006  Parker et al.

FOREIGN PATENT DOCUMENTS

CN   108657864 A   10/2018
CN   209747650 U   12/2019
(Continued)

OTHER PUBLICATIONS

The Extended European Search Report received in the corresponding European Application 23165798.2, mailed Sep. 1, 2023.

*Primary Examiner* — Vishal I Patel
(74) *Attorney, Agent, or Firm* — Kilpatrick Townsend & Stockton LLP (57) ABSTRACT

An adhesive application apparatus and a battery production line are provided. The adhesive application apparatus includes an unwinding mechanism, a first winding mechanism, an adhesive application mechanism, and a second winding mechanism. The unwinding mechanism is configured to dispose and unwind the double-sided adhesive. The first winding mechanism is configured to peel off and wind the first release paper. The adhesive application mechanism and the winding mechanism jointly define a first path, where the first path is used to guide the adhesive strip to move forward. The adhesive application mechanism includes an adhesive application member disposed on a side of the first path, where the adhesive application member is configured to applies pressure from a side of the first path to the double-sided adhesive, so as to attach the adhesive strip on an object surface. The second winding mechanism is configured to peel off and wind the second release paper.

17 Claims, 1 Drawing Sheet

(58) Field of Classification Search
CPC .... B65H 2801/72; B65H 2301/414422; B65H 2301/5113; H01M 2008/1095; H01M 10/0409; H01M 10/0431; H01M 10/0404
See application file for complete search history.

(56) References Cited

FOREIGN PATENT DOCUMENTS

| | | | | |
|---|---|---|---|---|
| CN | 214381607 U | * | 10/2021 | ............ B65H 16/04 |
| EP | 2665657 A1 | | 11/2013 | |

* cited by examiner

ADHESIVE APPLICATION APPARATUS AND BATTERY PRODUCTION LINE HAVING SUCH ADHESIVE APPLICATION APPARATUS

CROSS-REFERENCE TO RELATED APPLICATIONS

This application claims priority to Chinese Application 202220855179.9, filed Apr. 14, 2022 and entitled "ADHESIVE APPLICATION APPARATUS AND BATTERY PRODUCTION LINE HAVING SUCH ADHESIVE APPLICATION APPARATUS", which is incorporated herein by reference in its entirety.

TECHNICAL FIELD

This application relates to the field of battery production technologies, and in particular, to an adhesive application apparatus and a battery production line having such adhesive application apparatus.

BACKGROUND

Energy conservation and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

During battery production, when coating, rolling, and die-cutting have been performed on electrode plates, the electrode plates need to be wound to rolls and have adhesive applied thereon, for the ease of storage or transport. In conventional technologies, the success rate of automated adhesive application on electrode plate rolls is relatively low, about 50%. When automated adhesive application on an electrode plate roll fails, the machine needs to be shut down and adjusted manually, which affects OEE (Overall Equipment Effectiveness, overall equipment effectiveness) of the production line.

SUMMARY

In view of this, an adhesive application apparatus and a battery production line with the adhesive application apparatus need to be provided, so as to resolve a problem in the conventional technology that automated adhesive application on an electrode plate roll tends to fail.

According to a first aspect, this application provides an adhesive application apparatus, configured to apply a double-sided adhesive on an object surface. The double-sided adhesive includes first release paper, second release paper, and adhesive strips. A plurality of adhesive strips are spaced apart between the second release paper and the first release paper, where the first release paper detaches from the adhesive strip more easily than the second release paper. The adhesive application apparatus includes an unwinding mechanism, a first winding mechanism, an adhesive application mechanism, and a second winding mechanism. The unwinding mechanism is configured to dispose and unwind the double-sided adhesive. The first winding mechanism is configured to peel off and wind the first release paper. The adhesive application mechanism and the unwinding mechanism jointly define a first path, where the first path is used to guide the adhesive strip to move forward. The adhesive application mechanism includes an adhesive application member disposed on a side of the first path, where the adhesive application member is configured to apply pressure from a side of the first path to the double-sided adhesive, so as to attach the adhesive strip on an object surface. The second winding mechanism is configured to peel off and wind the second release paper.

In the foregoing solution, the double-sided adhesive with the first release paper and the second release paper is used, and the first winding mechanism and the second winding mechanism are configured to wind the first release paper and the second release paper respectively, so as to avoid the adhesive strip between the first release paper and the second release paper from being attached to a surface of the adhesive application member or another member and prevent adhesive application failure caused thereby. On the other hand, a plurality of adhesive strips are spaced apart, and the adhesive application member in the adhesive application mechanism is configured to apply pressure from a side of the double-sided adhesive to the double-sided adhesive, so that the adhesive strip can be directly attached to the object surface, without an adhesive cutting process or a cutter mechanism. This avoids the adhesive application failure due to adhesive cutting, thereby improving efficiency and success rate of adhesive application.

The following further describes the technical solution in this application.

In any implementation, a tension assembly is disposed between the adhesive application mechanism and the second winding mechanism, and the adhesive application mechanism, the second winding mechanism, and the tension assembly form a second path. The second path is used to guide the second release paper after being peeled to move forward, and the tension assembly can extend or shorten length of the second path. The tension assembly is disposed between the adhesive application mechanism and the second winding mechanism, so that the second release paper can be kept stretched on the second path. In addition, when the second winding mechanism does not rotate, the length of the second path is extended, so that the second release paper and the adhesive strip at the adhesive application mechanism move along the second path.

In any implementation, the tension assembly includes at least one position-adjustable movable wheel, and the movable wheel participates in defining the second path. When a position of the movable wheel is adjusted, the length of the second path is extended or shortened. The position-adjustable movable wheel is disposed, so the position of the movable wheel can be adjusted to change an arc of the second path, thereby changing a length of the second path between the adhesive application mechanism and the second winding mechanism. As a result, the position of the movable wheel can be adjusted, so that the second release paper and the adhesive strip at the adhesive application mechanism move along the second path.

In any implementation, the tension assembly further includes a fixed wheel disposed in cooperation with the movable wheel. A gap is formed between the fixed wheel and the movable wheel, the gap serves as a part of the second path, and the movable wheel can move along a direction toward or away from the fixed wheel. The fixed wheel is disposed in cooperation with the movable wheel, so that when the movable wheel moves relative to the fixed wheel, the gap between the movable wheel and the fixed wheel can be changed to change the length of the second path.

In any implementation, the tension assembly further includes a first driving member. The first driving member connects to the movable wheel, and the first driving member is configured to drive the movable wheel to move. The first driving member is disposed to provide kinetic energy for the movable wheel, so as to drive the movable wheel to move.

In any implementation, along the first path, a first guiding wheel is disposed between the unwinding mechanism and the first winding mechanism, and the first winding mechanism and the adhesive application mechanism are disposed on different sides of the first guiding wheel. The first winding mechanism and the first guiding wheel jointly define a third path used to guide the first release paper to move forward, and the first guiding wheel and the adhesive application mechanism jointly define part of the first path. The first guiding wheel is disposed to keep the first release paper, the adhesive strip, and the second release paper all stretched after detachment, so as to facilitate the adhesive application mechanism in applying adhesives.

In any implementation, along the first path, a detection apparatus is disposed between the first winding mechanism and the adhesive application mechanism, configured to detect whether any adhesive strip is present on a surface of the second release paper. A scenario, in which no adhesive strip is present on a surface of the second release paper because an adhesive strip is attached to the first release paper when the first release paper is detached from the adhesive strip and the second release paper, can be detected. This avoids missed adhesive application due to absence of the adhesive strip.

In any implementation, the adhesive application member is configured to be able to move back and forth along a direction perpendicular to the adhesive strip. The adhesive application member moves back and forth along the direction perpendicular to the adhesive strip, so that the adhesive application member can apply perpendicular pressure to the adhesive strip from a side, opposite the adhesive strip, of the second release paper. In this way, the adhesive strip is attached to the object surface.

In any implementation, the adhesive application mechanism further includes a first tension wheel and a second tension wheel. Along the first path, the first tension wheel and the second tension wheel are respectively disposed on sides upstream and downstream of the adhesive application member, and the first tension wheel, the second tension wheel, and the adhesive application member jointly define part of the first path. The second release paper is stretched to avoid displacement of the second release paper and the adhesive strip due to insecure placement during movement. In addition, when the length of the second path is being adjusted, the tension assembly can drive the second release paper and the adhesive strip to move.

According to a second aspect, this application further provides a battery production line, including the adhesive application apparatus according to any one of the foregoing implementations, and the adhesive application apparatus is configured to apply a double-sided adhesive on a surface of an electrode plate.

BRIEF DESCRIPTION OF DRAWINGS

The drawings as a part of this application are intended for better understanding of this application, and constitute a part of this application. Exemplary implementations and descriptions thereof in this application are intended to interpret this application and do not constitute any improper limitation on this application.

To describe the technical solutions in the implementations of this application more clearly, the following briefly describes the accompanying drawings required for describing the implementations. Apparently, the accompanying drawings in the following description show merely some implementations of this application, and a person of ordinary skill in the art may derive other drawings from these accompanying drawings without creative efforts.

DESCRIPTION OF REFERENCE SIGNS

100. Adhesive application apparatus; 110. unwinding mechanism; 120. first winding mechanism; 130. adhesive application mechanism; 131. adhesive application member; 132. first tension wheel; 133. second tension wheel; 134. second driving member; 140. second winding mechanism; 150. tension assembly; 151. movable wheel; 152. fixed wheel; 153. first driving member; 160. first guiding wheel; 170. detection apparatus; 180. second guiding wheel; and 200. double-sided adhesive; 210. first release paper; 220. second release paper; and 230. adhesive strip.

DESCRIPTION OF EMBODIMENTS

To make the objectives, features and advantages of this application more comprehensible, the following further describes specific implementations of this application in detail with reference to the accompanying drawings. In the following descriptions, numerous specific details are set forth in order to provide a thorough understanding of this application. However, this application can be implemented in many other ways different from the ways described herein, and persons skilled in the art can make similar improvements without departing from the connotation of this application. Therefore, this application is not limited by the specific implementations disclosed below.

Unless otherwise defined, all technical and scientific terms used herein shall have the same meanings as commonly understood by those skilled in the art to which this application belongs. The terms used herein are merely intended to describe the specific implementations but not intended to constitute any limitation on this application. The terms "include", "comprise", and "having" and any other variations thereof in the specification, the claims and the foregoing brief description of drawings of this application are intended to cover a non-exclusive inclusion.

In the descriptions of implementations of this application, the term "and/or" in this application describes only an association relationship for describing associated objects and represents that three relationships may exist. For example, A and/or B may represent the following three cases: A alone, both A and B, and B alone. In addition, a character "l" in this specification generally indicates an "or" relationship between contextually associated objects.

In the descriptions of this application, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application.

In addition, the terms "first" and "second" are merely for the purpose of description, and shall not be understood as any indication or implication of relative importance or any implicit indication of the number of technical features indicated. Therefore, a feature defined by "first" or "second" may explicitly or implicitly include at least one such feature. In the description of this application, the meaning of "plurality" is at least two, for example two or three, unless otherwise specifically defined.

In this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements, unless otherwise defined explicitly. Persons of ordinary skill in the art can understand specific meanings of these terms in this application as appropriate to specific situations.

In this application, unless otherwise clearly specified and limited, a first feature being "on" or "under" a second feature may mean that the first and second features are in direct contact, or the first and second features are in indirect contact through an intermediary. Further, the first feature being "on", "above", or "on top of" the second feature may mean that the first feature is directly above or obliquely above the second feature, or simply mean that the first feature is horizontally higher than the second feature. The first feature being "under", "below", or "beneath" the second feature may mean that the first feature is directly beneath or obliquely beneath the second feature, or simply mean that the first feature is horizontally lower than the second feature.

It should be noted that when a component is referred to as being "fastened to" or "disposed at" another component, it may be directly fastened to the another component, or there may be a component in between. When a component is deemed as being "connected to" another component, it may be directly connected to the another component, or there may be a component in between.

Currently, from a perspective of market development, application of electric vehicle batteries is becoming more and more extensive. Electric vehicle batteries are widely used not only in energy storage power supply systems such as hydro, thermal, wind, and solar power plants, but also in electric transportation tools such as electric bicycles, electric motorcycles, electric vehicles, and fields such military equipment and aerospace. With the continuous expansion of traction battery application fields, the market demand is also constantly expanding, and battery production is also moving towards a more efficient direction.

Battery production includes a process for automated adhesive application of electrode plate rolls. To apply an adhesive on electrode plate rolls, a continuous double-sided adhesive is usually used for attaching the electrode plates. When the double-sided adhesive has been attached to the electrode plates, a cutter is needed to cut the double-sided adhesive, so as to complete adhesive application. The inventor has found that, the cutter tends to be blunt and positioning of the cutter is unreliable. In that case, cutting failure may be caused or release paper of the double-sided adhesive may be cut, resulting in a broken tape. In addition, the double-sided adhesive is prone to being attached to the cutter or the adhesive application roll, causing adhesive application failure and affecting device operation. Therefore, a success rate of automated adhesive application on the electrode plates is relatively low.

In order to alleviate the problem of low success rate of automated adhesive application on electrode plates, the inventor has found that segmented double-sided adhesive tape with double sides of release paper and a suitable adhesive application apparatus can be used to perform automated adhesive application on the electrode plates. Specifically, the adhesive application apparatus may include two winding mechanisms to wind the two pieces of release paper respectively. The two winding mechanisms rotate to make the double-sided adhesive move along the predefined path, so as to attach the segmented double-sided adhesive to an object surface by the adhesive application mechanism.

Based on the considerations above, in order to solve the problem that the success rate of automated adhesive application on electrode plate rolls is low, the inventor has researched in depth and designed an adhesive application apparatus. When the segmented double-sided adhesive with double sides of release paper is used, the cutter is not needed to cut the double-sided adhesive and the double-sided adhesive can be prevented from being attached to the cutter or a surface of the adhesive application roll, so that the adhesive application failure due to the double-sided adhesive being attached to the cutter or the adhesive application roll caused by the cutter being blunt or inaccurate positioning can be avoided, thereby increasing the success rate of automated adhesive application on the electrode plates.

The adhesive application apparatus can be used in, but not limited to, a battery production line, and can also be configured to apply double-sided adhesives to other objects. The battery production line provided in this application can be used for producing new energy batteries.

The following describes preferred implementations in this application with reference to the drawings.

Figure 1:
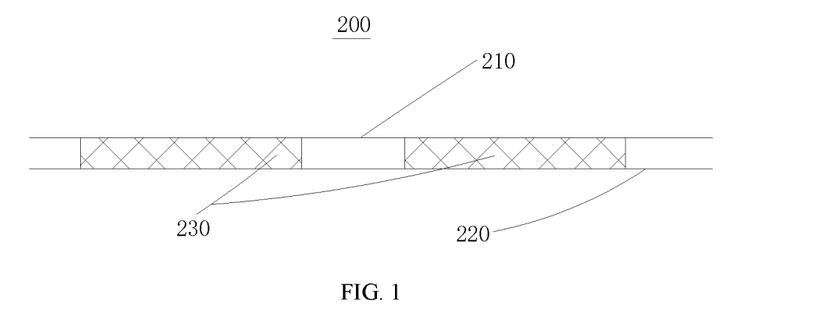
FIG. 1 is a schematic structural diagram of a double-sided adhesive according to this application.

The adhesive application apparatus 100 illustrated in this application uses a double-sided adhesive 200 as shown in FIG. 1. The double-sided adhesive 200 includes first release paper 210, second release paper 220, and a plurality of adhesive strips 230. The plurality of adhesive strips 230 are spaced apart between the second release paper 220 and the first release paper 210, where the first release paper 210 detaches from the adhesive strip 230 more easily than the second release paper 220.

The first release paper 210 and the second release paper 220 are anti-adhesive paper that prevents the prepreg from sticking and can protect the prepreg from contamination. The prepreg can be attached to the release paper, but not securely. For example, in this application, the prepreg is the adhesive strip 230. The adhesive strip 230 can be attached to the release paper, but not securely. Two opposite surfaces of the adhesive strip 230 are adhesive, and the first release paper 210 and the second release paper 220 are disposed on the two adhesive surfaces of the adhesive strip 230 respectively, so as to isolate the adhesive strip 230 from the outside, thereby preventing the adhesive strip 230 from being attached to another object. The two adhesive surfaces of the adhesive strip 230 can be completely detached from the first release paper 210 and the second release paper 220. The first release paper 210 detaches from the adhesive strip 230 more easily than the second release paper 220, so that when the first release paper 210 and the second release paper 220 are stripped in two directions, the adhesive strip 230 stays attached to the surface of the second release paper 220 and is detached from the first release paper 210. For ease of production, preferably, every two adjacent adhesive strips 230 are evenly spaced apart.

Figure 2:
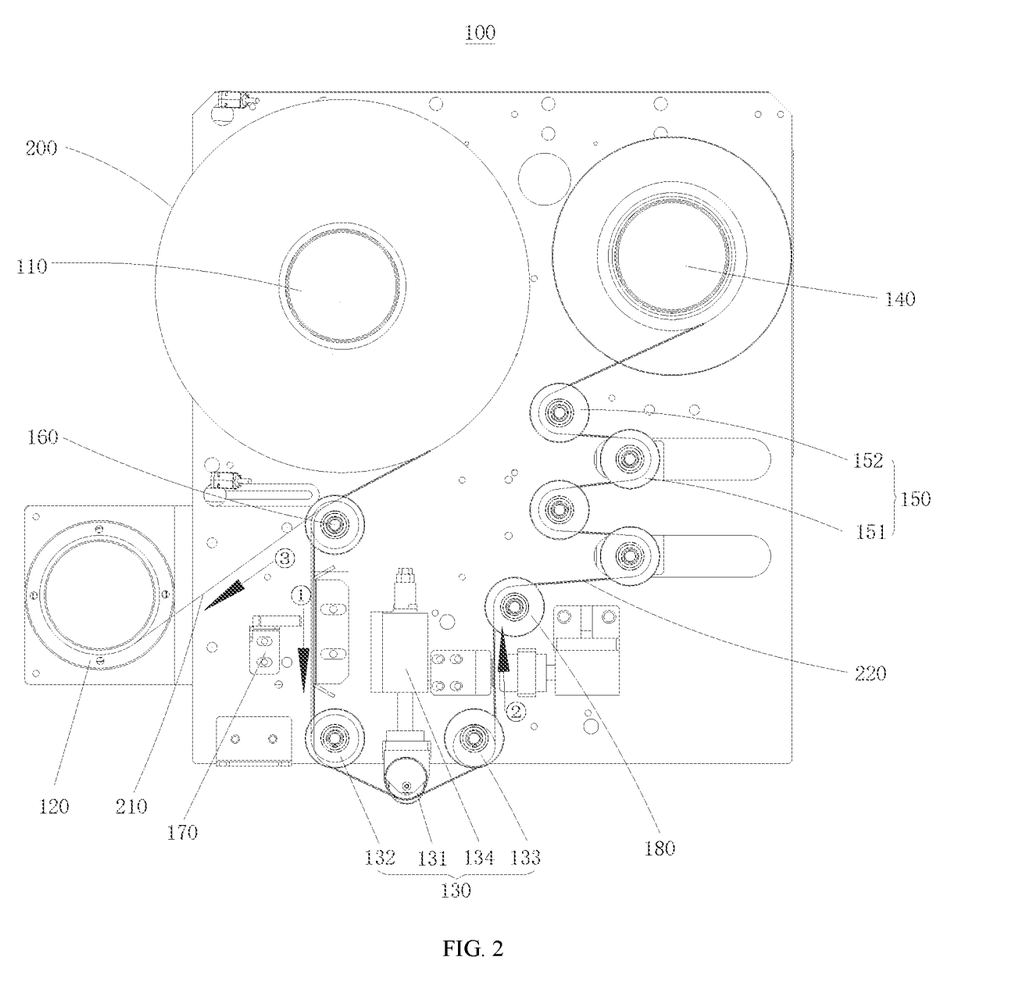
FIG. 2 is a structural diagram of an adhesive application apparatus according to an implementation of this application.

FIG. 2 shows the adhesive application apparatus 100 according to an embodiment of this application, configured to apply the double-sided adhesive 200 on an object surface. In this application, descriptions are provided based on an example, in which the object surface is a surface of an electrode plate roll in a battery cell. That is, the double-sided adhesive 200 is applied to the surface of an electrode plate roll. In another implementation, the adhesive application apparatus 100 may alternatively be used for applying the double-sided adhesive 200 to another object.

As shown in FIG. 2, the adhesive application apparatus 100 includes an unwinding mechanism 110, a first winding mechanism 120, an adhesive application mechanism 130, and a second winding mechanism 140. The unwinding mechanism 110 is configured to dispose and unwind the double-sided adhesive 200. The first winding mechanism 120 is configured to peel off and wind the first release paper 210. The adhesive application mechanism 130 and the unwinding mechanism 110 jointly define a first path, and the first path is used to guide the adhesive strip 230 to move forward. The adhesive application mechanism 130 includes an adhesive application member 131 disposed on one side of the first path, where the adhesive application member 131 is configured to apply pressure from the one side of the first path to the double-sided adhesive 200, so as to attach the adhesive strip 230 to an object surface. The second winding mechanism 140 is configured to peel off and wind the second release paper 220.

The unwinding mechanism 110 is configured to fasten the winded double-sided adhesive 200 and unwind the double-sided adhesive 200 by rotating. For example, the unwinding mechanism 110 includes an unwinding wheel that can rotate around its own axis, and the unwinding wheel is used for setting the winded double-sided adhesive. Further, the unwinding mechanism 110 may further be provided with a driving apparatus to drive the unwinding wheel to rotate. The driving apparatus may be an electrical motor, a heat engine, or the like.

The first winding mechanism 120 is used for winding the first release paper 210. When the first release paper 210 is being winded, the first release paper 210 continuously strips from the adhesive strip 230, and finally is completely detached from the adhesive strip 230. For example, the first winding mechanism 120 includes a winding wheel that can rotate around its own axis, and the winding wheel is used for setting the first release paper 210. Further, the first winding mechanism 120 may be provided with a driving apparatus to drive the winding wheel to rotate. The driving apparatus may be an electrical motor, a heat engine, or the like.

Along a moving direction of the adhesive strip 230, the adhesive application mechanism 130 is disposed on a downstream side of the first winding mechanism 120, and is configured to guide the second release paper 220 and the adhesive strip 230. In this way, the second release paper 220 and the adhesive strip 230 move along the first path, and the adhesive strip 230 is pressed to be attached to the object surface. In this implementation, the adhesive application mechanism 130 can attach the adhesive strip 230 to surfaces of the electrode plate rolls. In this implementation, "downstream" can be understood as a location or a direction, on a moving path of the adhesive strip 230, further away from the unwinding mechanism 110.

The adhesive application member 131 is provided on one side of the first path, and can apply pressure from one side of the first path to the double-sided adhesive 200. In the implementation shown in FIG. 1, the adhesive application member 131 can apply pressure to the adhesive strip 230 from one side, opposite the adhesive strip 230, of the second release paper 220, so that the adhesive strip 230 is attached to the object surface.

Along a moving direction of the second release paper 220, the second winding mechanism 140 is disposed on a downstream side of the adhesive application mechanism 130. The second winding mechanism 140 is configured to wind the second release paper 220, and provides a pulling force for the second release paper 220 and the adhesive strip 230 to move along the first path. For example, the second winding mechanism 140 includes a winding wheel that can rotate around its own axis, and the winding wheel is used for setting the second release paper 220. Further, the second winding mechanism 140 may be provided with a driving apparatus to drive the winding wheel to rotate. The driving apparatus may be an electrical motor, a heat engine, or the like. In this implementation, "downstream" can be understood as a location or a direction, on a moving path of the adhesive strip 220, further away from the unwinding mechanism 110.

When the adhesive application apparatus 100 in the foregoing solutions is used to apply the double-sided adhesive 200 on the object surface, the winded double-sided adhesive 200 is fastened to the unwinding mechanism 110, the first release paper 210 of the double-sided adhesive 200 is winded by the first winding mechanism 120, and the second release paper 220 passes through the adhesive application mechanism 130 along the first path and is finally winded by the second winding mechanism 140. The second winding mechanism 140 rotates and drives the second release paper 220 and the adhesive strip 230 to move along the first path. When the adhesive strip 230 passes through the adhesive application mechanism 130, the adhesive application member 131 in the adhesive application mechanism 130 applies pressure to the adhesive strip 230 from one side, opposite the adhesive strip 230, of the second release paper 220, so that the adhesive strip 230 is attached to the object surface. In the foregoing process, the first release paper 210, the second release paper 220, and the adhesive strip 230 first move together along the first path. When the first release paper 210 moves along the second path and is peeled off from the double-sided adhesive 200, the second release paper 220 and the adhesive strip 230 continue to move along the first path. When the adhesive strip 230 is attached to the object surface, the second release paper 220 is winded by the second winding mechanism 140.

In the foregoing solution, the double-sided adhesive 200 with the first release paper 210 and the second release paper 220 is used, and the first winding mechanism 120 and the second winding mechanism 140 are configured to wind the first release paper 210 and the second release paper 220 respectively, so as to avoid the adhesive strip 230 between the first release paper 210 and the second release paper 220 from being attached to a surface of the adhesive application member 131 or another member and prevent adhesive application failure caused thereby. On the other hand, a plurality of adhesive strips 230 are spaced apart, and the adhesive application member 131 in the adhesive application mechanism 130 is configured to apply pressure from a side of the double-sided adhesive 200 to the double-sided adhesive 200, so that the adhesive strip 230 can be directly attached to the object surface without an adhesive cutting process or a cutter mechanism. This avoids the adhesive application failure due to adhesive cutting, thereby improving efficiency and success rate of adhesive application.

Refer to FIG. 2. According to some implementations of this application, optionally, a tension assembly 150 is disposed between the adhesive application mechanism 130 and the second winding mechanism 140, where the adhesive application mechanism 130, the second winding mechanism 140, and the tension assembly 150 form a second path. The second path is used to guide the second release paper 220 after being peeled to move forward, and the tension assembly 150 is able to extend or shorten length of the second path.

As shown in FIG. 2, along the moving path of the second release paper 220, the adhesive application mechanism 130, the tension assembly 150, and the second winding mechanism 140 are arranged in sequence and form a second path. When the second release paper 220 and the adhesive strip 230 pass through the adhesive application member 131 in the adhesive application mechanism 130, the adhesive strip 230 detaches from the second release paper 220, the adhesive strip 230 is attached to the object surface, and the second release paper 220 continues to move along the second path.

The tension assembly 150 is disposed between the adhesive application mechanism 130 and the second winding mechanism 140, so that the second release paper 220 can be kept stretched on the second path. In addition, when the second winding mechanism 140 does not rotate, the length of the second path is extended, so that the second release paper 220 and the adhesive strip 230 at the adhesive application mechanism 130 move along the second path.

Refer to FIG. 2. According to some implementations of this application, optionally, the tension assembly 150 includes at least one position-adjustable movable wheel 151, where the movable wheel 151 participates in defining the second path. When a position of the movable wheel 151 is adjusted, the length of the second path is extended or shortened.

The movable wheel 151 can move relative to the adhesive application mechanism 130 and the second winding mechanism 140, so that the length of the second path can be adjusted by adjusting the position of the movable wheel 151. In the implementation shown in FIG. 2, the movable wheel 151 can move horizontally, and the length of the second path is changed during such movement.

A plurality of movable wheels 151 may be provided and all participate in defining the second path. In this case, when the position of any movable wheel 151 is adjusted, the length of the second path is extended or shortened. In the implementation shown in FIG. 2, two movable wheels 151 are provided and both participate in defining the second path.

The position-adjustable movable wheel 151 is disposed, and the position of the movable wheel 151 can be adjusted to change an arc of the second path, thereby changing a length of the second path between the adhesive application mechanism 130 and the second winding mechanism 140. In this way, the position of the movable wheel 151 is adjusted, so that the second release paper 220 and the adhesive strip 230 at the adhesive application mechanism 130 move along the second path.

Refer to FIG. 2. According to some implementations of this application, optionally, the tension assembly 150 further includes a fixed wheel 152 disposed in cooperation with the movable wheel 151. A gap is formed between the fixed wheel 152 and the movable wheel 151, the gap serves as a part of the second path, and the movable wheel 151 is able to move toward or away from the fixed wheel 152.

The second release paper 220 passes through the fixed wheel 152 and the movable wheel 151 in sequence or passes through the fixed wheel 152 and the movable wheel 151 in sequence, so that the gap between the fixed wheel 152 and the movable wheel 151 forms a part of the second path. When the movable wheel 151 moves toward the fixed wheel 152, the gap between the movable wheel 151 and the fixed wheel 152 becomes smaller, and the length of the second path is shortened; when the movable wheel 151 moves away from the fixed wheel 152, the gap between the movable wheel 151 and the fixed wheel 152 becomes larger, and the length of the second path is extended.

The fixed wheel 152 and the movable wheel 151 are disposed in cooperation, and the fixed wheel 152 and the movable wheel 151 may be disposed in a one-to-one correspondence. As shown in FIG. 2, two movable wheels 151 and two fixed wheel 152 are provided, each movable wheel 151 and a corresponding fixed wheel 152 are spaced apart, so that when the movable wheel 151 moves, the gap between the movable wheel 151 and the corresponding fixed wheel 152 becomes larger or smaller, thereby extending or shortening the length of the second path. In another implementation, the fixed wheel 152 and the movable wheel 151 are spaced apart and may be different in quantity. For example, one movable wheel 151 is disposed between two fixed wheels 152, or one fixed wheel 152 is disposed between two movable wheels 151.

The fixed wheel 152 is disposed in cooperation with the movable wheel 151, so that when the movable wheel 151 moves relative to the fixed wheel 152, the gap between the movable wheel 151 and the fixed wheel 152 can be changed to change the length of the second path.

According to some implementations of this application, optionally, the tension assembly 150 further includes a first driving member 153 (not shown in the figure). The first driving member 153 connects to the movable wheel 151, and the first driving member 153 is configured to drive the movable wheel 151 to move.

The first driving member 153 is configured to provide kinetic energy for the movable wheel 151 to move, and may be a cylinder, an electric motor, a heat engine, or the like. The first driving member 153 is disposed to provide kinetic energy for the movable wheel 151, so as to drive the movable wheel 151 to move.

Refer to FIG. 2. According to some implementations of this application, optionally, along the first path, a first guiding wheel 160 is disposed between the unwinding mechanism 110 and the first winding mechanism 120. The first winding mechanism 120 and the adhesive application mechanism 130 are disposed on different sides of the first guiding wheel 160. The first winding mechanism 120 and the first guiding wheel 160 jointly define a third path for guiding the first release paper 210 to move forward, and the first guiding wheel 160 and the adhesive application mechanism 130 jointly define part of the first path.

As a point where the first release paper 210 is separated from the adhesive strip 230 and the second release paper 220, the second guiding wheel 180 can define, together with the first winding mechanism 120, the third path that the first release paper 210 moves on, and can further define, together with the adhesive application mechanism 130, the first path that the second release paper 220 and the adhesive strip 230 move on.

The first guiding wheel 160 is disposed to keep the first release paper 210, the adhesive strip 230, and the second release paper 220 stretched, so as to facilitate the adhesive application mechanism 130 in applying adhesives.

Refer to FIG. 2. According to some implementations of this application, optionally, along the second path, a second guiding wheel 180 is disposed between the adhesive application mechanism 130 and the second winding mechanism 140. The adhesive application mechanism 130 and the second winding mechanism 140 are disposed on different sides of the second guiding wheel 180. The adhesive application mechanism 130, the second guiding wheel 180, the tension assembly 150, and the second winding mechanism 140 jointly define the second path. Preferably, as shown in FIG. 2, the second guiding wheel 180 is between the adhesive application mechanism 130 and the tension assembly 150.

Refer to FIG. 2. According to some implementations of this application, optionally, along the first path, a detection apparatus 170 is disposed between the first winding mechanism 120 and the adhesive application mechanism 130, and is configured to detect whether any adhesive strip 230 is present on a surface of the second release paper 220.

The detection apparatus 170 is configured to detect whether any adhesive strip 230 is present on a surface of the second release paper 220. A scenario, in which no adhesive strip 230 is present on a surface of the second release paper 220 because an adhesive strip 230 is attached to the first release paper 210 when the first release paper 210 is detached from the adhesive strip 230 and the second release paper 220, can be detected. This avoids missed adhesive application due to absence of the adhesive strip 230.

The detection apparatus 170 may be an optical detection mechanism, and can determine whether any adhesive strip 230 is present on the surface of the second release paper 220 based on different surface colors of the second release paper 220 and the adhesive strip 230.

Refer to FIG. 2. According to some implementations of this application, optionally, the adhesive application member 131 is configured to be able to move back and forth along a direction perpendicular to the adhesive strip 230.

The adhesive application member 131 moves back and forth along the direction perpendicular to the adhesive strip 230, so that the adhesive application member 131 can apply perpendicular pressure to the adhesive strip 230 from a side, opposite the adhesive strip 230, of the second release paper 220, so that the adhesive strip 230 is attached to the object surface.

In the implementation as shown in FIG. 2, the adhesive application member 131 is connected to the second driving member 134, and the second driving member 134 is configured to provide kinetic energy for the adhesive application member 131 to move back and forth perpendicular to the adhesive strip 230, where the second driving member 134 may be a cylinder, a heat engine, an electric motor, or the like.

Refer to FIG. 2. According to some implementations of this application, optionally, the adhesive application mechanism 130 further includes a first tension wheel 132 and a second tension wheel 133. Along the first path, the first tension wheel 132 and the second tension wheel 133 are respectively disposed on sides upstream and downstream of the adhesive application member 131, and the first tension wheel 132, the second tension wheel 133, and the adhesive application member 131 jointly define part of the first path.

The first tension wheel 132 and the second tension wheel 133 are used to stretch the second release paper 220, so as to avoid displacement of the second release paper 220 and the adhesive strip 230 due to insecure placement during movement. In this way, the second release paper 220 and the adhesive strip 230 are driven to move when the tension assembly 150 is adjusting the length of the second path.

According to some implementations of this application, as shown in FIG. 2, this application provides the adhesive application apparatus 100 that uses the double-sided adhesive 200 shown in FIG. 1. The adhesive application apparatus 100 includes the unwinding mechanism 110, the first winding mechanism 120, the adhesive application mechanism 130, the tension assembly 150, and the second winding mechanism 140. When the double-sided adhesive 200 is unwound by the unwinding mechanism 110, the first guiding wheel 160 and the first winding mechanism 120 jointly define a moving path of the first release paper 210, and the path is denoted as the third path. The first guiding wheel 160 and the adhesive application mechanism 130 jointly define a moving path of the second release paper 220 and the adhesive strip 230, and the path is denoted as the first path. The adhesive application mechanism 130, the tension assembly 150, and the second winding mechanism 140 jointly define a moving path of the second release paper 220 that is detached from the adhesive strip 230, and the path is denoted as the second path.

When the adhesive application apparatus 100 in the foregoing solutions is used to apply the double-sided adhesive 200 on the object surface, the winded disposed double-sided adhesive 200 is fastened to the unwinding mechanism 110, the first release paper 210 of the double-sided adhesive 200 is winded by the first winding mechanism 120 along the third path, and the second release paper 220 and the adhesive strip 230 pass through the detection apparatus 170 along the first path, where whether any adhesive strip 230 is present on the surface of the second release paper 220 is detected, and reaches the adhesive application mechanism 130. The second release paper 220 and the adhesive strip 230 pass through the first tension wheel 132 and the adhesive application member 131 successively, the second release paper 220 and the adhesive strip 230 are separated at the adhesive application member 131, and the second release paper 220 that is separated from the adhesive strip 230 continues to pass through the tension assembly 150 along the second path and reaches the second winding mechanism 140. In the adhesive application mechanism 130, the second release paper 220 is stretched between the first tension wheel 132 and the second tension wheel 133, and the second driving member 134 drives the adhesive application member 131 to apply pressure to the adhesive strip 230 from one side, opposite the adhesive strip 230, of the second release paper 220. Then the second winding mechanism 140 stops rotating, the movable wheel 151 in the tension mechanism moves along a direction away from the fixed wheel 152. In this way, the second path is extended, driving the second release paper 220 and the adhesive strip 230 in the adhesive application mechanism 130 to move forward, and an adhesive is applied on the object surface. When the adhesive application is complete, the second winding mechanism 140 continues rotating to wind the second release paper 220, and the movable wheel 151 is restored to an initial position, so as to prepare for the next adhesive application.

This application further provides a battery production line, including the adhesive application apparatus 100 according to any one of the foregoing implementations, and the adhesive application apparatus 100 is configured to apply a double-sided adhesive 200 on a surface of electrode plates.

In conclusion, it should be noted that the foregoing examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all fall within the scope of claims and summary in this application. In particular, as long as there is no structural conflict, the various technical features mentioned in the implementations can be combined in any manners. This application is not limited to the specific implementations disclosed in this specification, but includes all technical solutions falling within the scope of the claims.

The invention claimed is:

1. An adhesive application apparatus for applying a double-sided adhesive on a surface of an object, wherein the double-sided adhesive comprises first release paper, second release paper, and a plurality of adhesive strips, the plurality of adhesives strips being spaced apart between the second release paper and the first release paper, wherein the first release paper detaches from the adhesive strip more easily than the second release paper, and wherein the adhesive application apparatus comprises:
an unwinding mechanism, configured to dispose and unwind the double-sided adhesive;
a first winding mechanism, configured to peel off and wind the first release paper;
an adhesive application mechanism, wherein the adhesive application mechanism and the unwinding mechanism jointly define a first path, the first path guiding the adhesive strip to move forward, and the adhesive application mechanism comprises an adhesive application member disposed on one side of the first path, wherein the adhesive application member is configured to apply pressure from the one side of the first path to the double-sided adhesive, to attach the adhesive strip to an object surface; and
a second winding mechanism, configured to peel off and wind the second release paper,
wherein the adhesive application mechanism further comprises a first tension wheel and a second tension wheel, wherein along the first path, the first tension wheel and the second tension wheel are respectively disposed on sides upstream and downstream of the adhesive application member, and the first tension wheel, the second tension wheel, and the adhesive application member jointly define part of the first path.

2. The adhesive application apparatus according to claim 1, wherein a tension assembly is disposed between the adhesive application mechanism and the second winding mechanism, wherein the adhesive application mechanism, the second winding mechanism, and the tension assembly form a second path, the second path guiding the second release paper after being peeled to move forward, and the tension assembly is able to extend or shorten length of the second path.

3. The adhesive application apparatus according to claim 2, wherein the tension assembly comprises at least one position-adjustable movable wheel, and wherein the movable wheel participates in defining the second path, and when a position of the movable wheel is adjusted, the length of the second path is extended or shortened.

4. The adhesive application apparatus according to claim 3, wherein the tension assembly further comprises a fixed wheel disposed in cooperation with the movable wheel, wherein a gap is formed between the fixed wheel and the movable wheel, the gap serving as a part of the second path, and the movable wheel being able to move toward or away from the fixed wheel.

5. The adhesive application apparatus according to claim 3, wherein the tension assembly further comprises a first driving member, wherein the first driving member connects to the movable wheel, and the first driving member is configured to drive the movable wheel to move.

6. The adhesive application apparatus according to claim 1, wherein along the first path, a first guiding wheel is disposed between the unwinding mechanism and the first winding mechanism, wherein the first winding mechanism and the adhesive application mechanism are disposed on different sides of the first guiding wheel, the first winding mechanism and the first guiding wheel jointly define a third path for guiding the first release paper to move forward, and the first guiding wheel and the adhesive application mechanism jointly define part of the first path.

7. The adhesive application apparatus according to claim 1, wherein along the first path, a detection apparatus is disposed between the first winding mechanism and the adhesive application mechanism, configured to detect whether any adhesive strip is present on a surface of the second release paper.

8. The adhesive application apparatus according to claim 1, wherein the adhesive application member is configured to be able to move back and forth along a direction perpendicular to the adhesive strips.

9. A battery production line, comprising the adhesive application apparatus according to claim 1, wherein the adhesive application apparatus is configured to apply a double-sided adhesive to a surface of a battery electrode plate.

10. An adhesive application apparatus for applying a double-sided adhesive on a surface of an object, wherein the double-sided adhesive comprises first release paper, second release paper, and a plurality of adhesive strips, the plurality of adhesives strips being spaced apart between the second release paper and the first release paper, wherein the first release paper detaches from the adhesive strip more easily than the second release paper, and wherein the adhesive application apparatus comprises:
an unwinding mechanism, configured to dispose and unwind the double-sided adhesive;
a first winding mechanism, configured to peel off and wind the first release paper;
an adhesive application mechanism, wherein the adhesive application mechanism and the unwinding mechanism jointly define a first path, the first path guiding the adhesive strip to move forward, and the adhesive application mechanism comprises an adhesive application member disposed on one side of the first path, wherein the adhesive application member is configured to apply pressure from the one side of the first path to the double-sided adhesive, to attach the adhesive strip to an object surface; and
a second winding mechanism, configured to peel off and wind the second release paper,
wherein a tension assembly is disposed between the adhesive application mechanism and the second winding mechanism, wherein the adhesive application mechanism, the second winding mechanism, and the tension assembly form a second path, the second path guiding the second release paper after being peeled to move forward, and the tension assembly is able to extend or shorten length of the second path.

11. The adhesive application apparatus according to claim 10, wherein the tension assembly comprises at least one position-adjustable movable wheel, and wherein the movable wheel participates in defining the second path, and when a position of the movable wheel is adjusted, the length of the second path is extended or shortened.

12. The adhesive application apparatus according to claim 11, wherein the tension assembly further comprises a fixed wheel disposed in cooperation with the movable wheel, wherein a gap is formed between the fixed wheel and the movable wheel, the gap serving as a part of the second path, and the movable wheel being able to move toward or away from the fixed wheel.

13. The adhesive application apparatus according to claim 12, wherein the tension assembly further comprises a first driving member, wherein the first driving member connects to the movable wheel, and the first driving member is configured to drive the movable wheel to move.

14. The adhesive application apparatus according to claim 10, wherein along the first path, a first guiding wheel is disposed between the unwinding mechanism and the first winding mechanism, wherein the first winding mechanism and the adhesive application mechanism are disposed on different sides of the first guiding wheel, the first winding mechanism and the first guiding wheel jointly define a third path for guiding the first release paper to move forward, and the first guiding wheel and the adhesive application mechanism jointly define part of the first path.

15. The adhesive application apparatus according to claim 10, wherein along the first path, a detection apparatus is disposed between the first winding mechanism and the adhesive application mechanism, configured to detect whether any adhesive strip is present on a surface of the second release paper.

16. The adhesive application apparatus according to claim 10, wherein the adhesive application member is configured to be able to move back and forth along a direction perpendicular to the adhesive strips.

17. The adhesive application apparatus according to claim 10, wherein the adhesive application mechanism further comprises a first tension wheel and a second tension wheel, wherein along the first path, the first tension wheel and the second tension wheel are respectively disposed on sides upstream and downstream of the adhesive application member, and the first tension wheel, the second tension wheel, and the adhesive application member jointly define part of the first path.

* * * * *